United States Patent [19]

Murata et al.

[11] Patent Number: 5,069,956

[45] Date of Patent: Dec. 3, 1991

[54] MULTILAYER COATING FOR THE INTERIOR SURFACE OF A CAN

[75] Inventors: Masahiro Murata; Yukiyasu Tanaka; Tomoo Kokawa, all of Hiratsuka, Japan

[73] Assignee: Kansai Paint Co., Ltd., Hyogoken, Japan

[21] Appl. No.: 530,392

[22] Filed: May 30, 1990

[30] Foreign Application Priority Data

May 30, 1989 [JP] Japan ................................. 1-136899
May 30, 1989 [JP] Japan ................................. 1-136900

[51] Int. Cl.$^5$ ........................ B32B 27/38; C08L 63/00
[52] U.S. Cl. .................................... 428/216; 428/413; 428/414; 428/416; 428/418; 428/506; 523/403; 523/409; 523/412
[58] Field of Search ............... 428/216, 413, 416, 414, 428/418, 506

[56] References Cited

U.S. PATENT DOCUMENTS

| | | | |
|---|---|---|---|
| 3,008,848 | 11/1961 | Annonio | 428/413 |
| 4,442,246 | 4/1984 | Brown et al. | 525/119 |
| 4,482,673 | 11/1984 | Brown et al. | 525/119 |
| 4,564,557 | 1/1986 | Ohgushi et al. | 428/413 |

*Primary Examiner*—P. C. Sluby

*Attorney, Agent, or Firm*—Wenderoth, Lind & Ponack

[57] ABSTRACT

A multilayer coating for the interior surface of a can, said coating being composed of (A) a primer coat layer having a dry film thickness of not more than 1 micrometer formed by using a thermosetting paint consisting of 59 to 98% by weight of a resol-type phenolic resin and 5 to 50% by weight of an epoxy-type resin having compatibility with the phenolic resin as a binder, and (B) an overcoat layer formed by overcoating a thermosetting paint to a dry film thickness of 2 to 20 micrometers, said thermosetting paint being selected from the group consisting of (a) an organic solvent-base thermosetting paint having a binder component composed of 50 to 95% by weight of an aromatic epoxy resin and 5 to 50% by weight of a resol-type phenolic resin, (b) a water-soluble (or water-dispersible) thermosetting paint having a binder component composed of an epoxy-acrylate resin which is a reaction product between a carboxyl-containing acrylic resin and an aromatic epoxy resin, and (c) a water-soluble (or water-dispersible) thermosetting paint resulting from substituting a resol-type phenolic resin for 1 to 50% by weight of the binder component of the paint (b).

12 Claims, No Drawings

MULTILAYER COATING FOR THE INTERIOR SURFACE OF A CAN

BACKGROUND OF THE INVENTION

1. Field of the Invention

This invention relates to a multilayer coating for the interior surface of a can, and more specifically, to a multilayer coating having excellent flavor retaining property, adhesion, corrosion resistance and fabricability, which is to be directly applied to the surface of a metallic can.

2. Description of the Prior Art

In the past an epoxy-type resin having superior corrosion resistance, fabricability and flavor retaining property has been used as a binder component of mainly solvent-base paints for cans. In water-base paints for cans, too, it is desired to use an epoxy resin as a binder because of its superior properties, and various proposals have been made on the use of epoxy-type resins. One example of a paint suitable for coating the interior surface of a can is a composition obtained by modifying an epoxy-type resin with a acrylic resin having a high acid value, neutralizing the excess of carboxyl groups with ammonia or an amine and dispersing the resulting modified epoxy resin in water (see, for example, Japanese Laid-Open Patent Publications Nos. 3481/1980 and 3482/1980). Another example of this type of paint is a composition obtained by graft-polymerizing an acrylic monomer containing a carboxyl group to the main chain of an epoxy resin, and dispersing the graft polymer in water using a basic compound such as ammonia and an amine (see Japanese Laid-Open Patent Publication No. 3482/1980).

The paints for coating the interior surface of a can containing solvent-base epoxy resins as binders give superior film properties, but it is still desired to improve the flavor retaining properties, adhesion, corrosion resistance and fabricability of the resulting coatings.

On the other hand, a coating composition comprising conventional aqueous dispersions of epoxy resins requires the use of a curing agent such as an amino resin or a phenolic resin because curing of the coating in the drying step is not sufficient. However, the use of these curing agents renders the flavor retaining property and adhesion (water-resistance adhesion) of the coating from the resulting aqueous coating composition insufficient, and this aqueous coating composition is unsuitable for application to the interior surface of a can.

Thus, conventional paints for coating the interior surface of a can cannot satisfy all of the required properties such as flavor retaining properties, adhesion, corrosion resistance and fabricability.

In view of the above state of the art, the present inventors repeated extensive investigations in order to develop a coating for the interior surface of a can which has superior flavor retaining properties, water-resistance adhesion, corrosion resistance, fabric-ability ability and hygienic property, and consequently found that the aforesaid problems can be solved by forming the coating in a multilayer and allotting the function of the coating to the individual layers.

SUMMARY OF THE INVENTION

Thus, according to this invention, there is provided a multilayer coating for the interior surface of a can, said coating being composed of (A) a primer coat layer having a dry film thickness of not more than 1 micrometer formed by using a thermosetting paint consisting of 59 to 98% by weight of a resol-type phenolic resin and 5 to 50% by weight of an epoxy-type resin having compatibility with the phenolic resin as a binder, and (B) an overcoat layer formed by overcoating a thermosetting paint to a dry film thickness of 2 to 20 micrometers, said thermosetting paint being selected from the group consisting of (a) an organic solvent-base thermosetting paint having a binder component composed of 50 to 95% by weight of an aromatic epoxy resin and 5 to 50% by weight of a resol-type phenolic resin, (b) a water-soluble (or water-dispersible) thermosetting paint having a binder component composed of an epoxy-acrylate resin which is a reaction product between a carboxyl-containing acrylic resin and an aromatic epoxy resin, and (c) a water-soluble (or water-dispersible) thermosetting paint resulting from substituting a resol-type phenolic resin for 1 to 50% by weight of the binder component of the paint (b).

DETAILED DESCRIPTION OF THE PREFERRED EMBODIMENTS

The primer coat layer (A) in this invention is directly formed on a metallic substrate. It has excellent adhesion to the substrate and imparts corrosion resistance to the substrate.

The resol-type phenolic resin used as a component of the thermosetting paint forming the primer coat layer (A) includes those obtained by reacting a phenol with formaldehyde in the presence of an alkali catalyst. From the standpoint of the sanitation of the can contents, flavor retaining property and the corrosion of the metallic substrate, trifunctional or higher monohydric phenols which produce three or more methylol groups by reaction with formaldehyde may be cited as preferred example of the phenol used for preparation of the phenolic resin. To improve the flexibility of the resol-type phenol resin it is possible to use together monohydric difunctional phenols. In the case of the latter, the structure of the resol-type phenolic resin is presumably that the difunctional phenols and the polyfunctional phenols are crosslinked at random through methylene bond, the difunctional phenols serve to adjust the molecular weight between the crosslink, and the trifunctional or higher phenols serve to adjust the density of crosslink.

The desired objects can be achieved whether the polyfunctional phenol and the difunctional phenol are co-condensed in the presence of an alkali catalyst or they are separately condensed and then mixed.

Examples of the polyfunctional phenols which are trifunctional or higher include monohydric phenols such as phenol, m-cresol and m-methoxyphenol and divalent phenols such as bisphenol A, bisphenol B and resorcinol, which are encompassed within phenols normally used. These trifunctional or higher phenols may be used singly to form resol-type phenolic resins. Alternatively, the trifunctional or higher phenols may be mixed to form resol-type phenolic resins.

Examples of the difunctional phenols which can be used together with the polyfunctional phenols include p-cresol, ortho-cresol, p-tert-butylphenol, p-methoxyphenol and p-nonylphenol which are normally used phenols.

There is no strict limitation on the ratio of the two used, and may be varied depending upon the desired properties of the resulting resol-type phenolic resin. Generally, the weight ratio of the polyfunctional phenol to the difunctional phenol may be from 90:10 to 60:40. Formaldehyde to be reacted with the phenols is in the form of an aqueous solution, an organic solution in an organic solvent, or a solution in a mixture of an organic solvent with water.

Examples of the alkali catalyst used in synthesizing the resol-type phenolic resin include sodium hydroxide, calcium hydroxide, magnesium hydroxide, basic metal salts, ammonia, hexamethylenetetramine, trimethylamine, triethylamine, and pyridine.

The resol-type phenolic resin may be synthesized by known methods, for example, by a method comprising heating a phenol with a formaldehyde solution in the presence of an alkali catalyst, performing the reaction while cooling and refluxing water and formaldehyde which evaporate, and separating the resulting condensation product from water. After separating the water, the heating may be performed to advance condensation further. As a result, a solvent-soluble-type resol phenolic resin can be obtained.

The resol phenolic resin used in this invention may be solvent-soluble, or soluble or dispersible in water (to be simply abbreviated "water-soluble"). Generally, low-molecular-weight, high methylol resol-type phenolic resins are water soluble, and can be used suitably. If the molecular weight of the resol-type phenolic resins becomes high, they are no longer water-soluble. But if they are neutralized with an alkaline compound, they can be rendered water-soluble. As the molecular weight of the resins further increases, they gradually lose water solubility. They can be made water-soluble by co-condensing salicylic acid or 4,4'-bis(4-hydroxyphenyl)valeric acid and neutralizing the resulting resins with an alkaline compound.

One effective means for increasing the water solubility of the resol-type phenolic resin is to use a small amount of a water-miscible solvent (such as an alcohol, a Cellosolve-type solvent or a carbitol-type solvent) as a cosolvent with water.

In the present invention, low-molecular-weight high methylol resol-type phenolic resins are preferred as the water-soluble resol-type phenolic resins. For the synthesis of these resins, the amount of formaldehyde to be added relative to the phenols is important. It is necessary to use formaldehyde in an excessive amount with respect to the theoretical functional hydrogen. Specifically, it is desirable to use 4 to 10 moles of formaldehyde per mole of the phenol.

The production of the water-soluble phenolic resins can be carried out by known method in a suitable reaction medium, generally in water and/or an alcohol medium. Any of basic catalysts are used for the production of resol-type phenolic resins. To obtain resol-type phenolic resins which can exhibit the desired effect, it is preferable to use an alkali metal hydroxide or an alkaline earth metal hydroxide, such as sodium hydroxide, potassium hydroxide, magnesium hydroxide, barium hydroxide or trisodium phosphate.

Advantageously, the phenol component of the aforesaid water-soluble resol-type phenolic resin may be the same as those described in detail with regard to the synthesis of solvent-soluble resol-type phenolic resins.

The alkaline compounds used to water-solubilize the resol-type phenolic resin by neutralization may preferably be those which volatilize at the time of baking and drying the coated film. Known compounds normally used to neutralize the phenolic OH group may be used without any particular limitation. Examples include primary amines such as methylamine, ethylamine and monoethanolamine, secondary amines such as dimethylamine and diethanolamine, and tertiary amines such as triethylamine and diethylethanolamine. The amount of the neutralizing agent to be used is usually 0.1 to 2, preferably 0.5 to 1.2, equivalents with respect to the phenolic OH group in the reactant.

The epoxy-type resin to be used together in the thermosetting paint for forming the primer coat layer (A) may be any epoxy resin which has compatibility with the phenol resin. From the standpoint of hygienic property on foods to be held in a can, flavor retaining property and corrosion resistance, aromatic epoxy resins, particularly bisphenol-type epoxy resins, are desirable for application to the interior surface of a can.

The bisphenol-type epoxy resins to be used in this invention include, for example epoxy resins which are obtained by reacting bisphenols such as bis(4 hydroxyphenyl)methane, 2,2-bis(4-hydroxyphenyl)propane and 2,2-bis(4-hydroxyphenyl)butane with epichlorohydrin in the presence of alkaline catalysts. Specific examples of such epoxy resins are commercially available under the tradenames Epikote 828, Epikote 1001, Epikote 1004, Epikote 1007, Epikote 1009, and Epikote 1010.

Especially preferred epoxy resins are those having an epoxy equivalent of 1,500 to 3,500, especially 2,000 to 3,000, for example, Epikote 1007 and Epikote 1009.

The epoxy resins described above are mainly of the solvent-soluble type. Organic solvents used to dissolve these resins include, for example, ketones such as acetone, methyl ethyl ketone, methyl isobutyl ketone, cyclohexanone and isophorone; aromatic hydrocarbons such as benzene, toluene, xylene and other alkylbenzenes; Cellosolves such as methyl Cellosolve, ethyl Cellosolve; and esters such as methyl Cellosolve acetate, butyl Cellosolve acetate, ethyl acetate and butyl acetate; and alcohols such as isopropanol, butyl alcohol and diacetone alcohol. They may be used singly or as mixtures with each other.

Examples of the water-soluble epoxy resins may include the reaction product of a carboxyl-containing acrylic resins and an aromatic epoxy resin, which is a component of the thermosetting paint (b) for forming the overcoat layer (B) to be described hereinafter. It may be used in the form of an aqueous solution or dispersion in combination with the resol-type phenolic resin. The proportions of the resol-type phenolic resins and the epoxy-type resin in the thermosetting paint (to be referred to as the primer coating paint) may be 50 to 98% by weight, preferably 60 to 80% by weight for the former, and 2 to 50% by weight, especially 20 to 40% by weight, for the latter.

The primer coat layer (A) is formed by coating the primer coating paint by known coating methods such as roller coating or spray coating and baking the coated film at a temperature of 180° to 220° C. for about 10 seconds to about 5 minutes. Depending upon the shape of the metallic substrate, flow coating and shower coating may be applied.

The dry film thickness (hereinafter simply referred to as film thickness) of the primer coat layer (A) is preferably as small as possible. For this purpose, the solids content of the primer coating paint is desirably not more than 10% by weight, preferably 2 to 8% by weight.

Investigations of the present inventors show that if the film thickness exceeds 1 micrometer, inadequacy was frequently experienced. The reasons are as follows: Firstly, the coated film is cured, but contains low-molecular weight components that may possibly be extracted by can contents. Thus, from the standpoint of food hygienic property of the can contents the film thickness of the corrosion-resistant primer coat layer (A) should preferably have as small a thickness as possible. Secondly, a corrosion-resistant primer coat layer should desirably have strong affinity for the metallic surface and prevent intrusion of corrosive substances such as water, oxygen, sulfurous acid gas and a chlorine ion, and should have such a function that even if such corrosive substances intrude, the binding force between the metal surface and the coat layer is not destroyed by the corrosive substances. When the stress of distortion is great, it acts on the interface between the coat layer and the metal surface and destroys adhesion. The shearing force based on the stress of distortion generated in the coat layer is proportional to the cross sectional area of the coat layer, and becomes smaller as the film thickness of the coat layer becomes thinner.

The overcoat layer (B) in the multilayer coating of this invention may be formed from any of the thermosetting paints (to be referred to as the overcoating paint) (a) to (c).

(a) An organic solvent-base thermosetting paint containing as binder components an aromatic epoxy resin and a resol-type phenolic resin:

This paint may be the same in composition as the thermosetting paint described above for the formation of the primer coat layer (A). But the proportions of the epoxy resin and the resol-type phenolic resin are different. In this overcoating paint, the proportion of the epoxy resin is 50 to 95% by weight, preferably 70 to 90% by weight, and the proportion of the resol-type penolic resin is 5 to 50% by weight, preferably 10 to 30% by weight. If the proportion of the epoxy resin is less than 50% by weight and the proportion of the resol-type phenolic resin is more than 50% by weight, the hygienic property or flavor retaining property of the can contents are likely to be degraded, and problems in a can-making process (for instance, the fabricability of the coated substrate) may possibly occur.

(b) A water-soluble thermosetting paint containing as a binder an epoxy-acrylate resin which is the reaction product between a carboxyl-containing acrylic resin and an aromatic epoxy resin:

Known water-base paint compositions composed of aromatic epoxy resins and carboxyl-containing acrylic resins may be used (see, for example, U.S. Pat. Nos. 4247439, 4212781, 4308185, and 4302373). Typical examples include a thermosetting paint containing as a binder a water-soluble epoxy-acrylate resin which is obtained by mixing an aromatic epoxy resin with a carboxyl-containing acrylic resin in such a mixing ratio that the carboxyl groups are excessive with respect to the epoxy groups, and carrying out ester addition reaction action in the presence of a tertiary amine in an organic solvent; a thermosetting paint containing as a binder component a water-soluble epoxy-acrylate resin which is obtained by graft-polymerizing a radical-polymerizable unsaturated monomer to be described below and including carboxyl-containing unsaturated monomers to an aromatic epoxy resin in the presence of a radical generator such as benzoyl peroxide in an organic solvent.

The aromatic epoxy resin used for the production of the epoxy-acrylate resin described above has a number average molecular weight of usually 1,400 to 8,000, preferably 2,900 to 7,000. If its number average molecular weight is less than 1,400, low-molecular weight components attributed to the epoxy resin dissolve in the can contents during a sterilization treatment, and this is hygienically undesirable. If the number average molecular weight of the epoxy resin exceeds 8,000, the viscosity becomes excessively high at the time of reaction with the acrylic resin, and stable emulsification tends to become difficult.

Specific examples of the aromatic epoxy resin are Epikote 1004 (epoxy equivalent about 900, number average molecular weight about 2,900), Epikote 1007 (epoxy equivalent about 1,700, number average molecular weight about 2,900), Epikote 1009 (epoxy equivalent about 3,500, number average molecular weight about 3,750), and Epikote 1010 (epoxy equivalent about 4,500, number average molecular weight about 7,500).

Examples of the carboxyl-containing acrylic resin include acrylic resins obtained by (co)polymerizing at least one radical-polymerizable unsaturated monomer containing a carboxyl group shown in group (i) below and as required, a copolymerizable radical-polymerizable unsaturated monomer shown in group (ii) below.

(i) Alpha,beta-ethylenically unsaturated carboxylic acids such as acrylic acid, methacrylic acid, maleic acid, and crotonic acid.

(ii) Hydroxyalkyl esters having 1 to 8 carbon atoms of (meth)acrylic acid such as 2-hydroxyethyl (meth)acrylate and hydroxypropy (meth)acrylate; $C_{1-24}$ alkyl or cycloalkyl esters of (meth)acrylic acid such as methyl (meth)acrylate, ethyl (meth)acrylate, n-butyl (meth)acrylate, isobutyl (meth)acrylate, cyclohexyl (meth)acrylate, 2-ethylhexyl (meth)acrylate, lauryl (meth)acrylate, and stearyl (meth)acrylate; (meth)acrylamides such as (meth)acrylamide, N-methyl (meth)acrylamide, diacetone acrylamide, N-methylol (meth)acrylamide, and N-methoxymethyl (meth)acrylamide; vinyl monomers such as styrene, alpha-methyl styrene, vinyl acetate, vinyl propionate, vinyl pivalate, (meth)acrylonitrile and Veova monomer (Shell Chemical Co., Ltd.).

The preferred combination of the above unsaturated monomers includes (a) methyl methacrylate/2-ethylhexyl acrylate/acrylic acid, (b) styrene/methyl methacrylate/ethyl acrylate/methacrylic acid, (c) styrene/ethyl acrylate/methacrylic acid, and (d) methyl methacrylate/ethyl acrylate/acrylic acid.

The carboxyl-containing acrylic resin may be prepared from these monomers easily by known solution polymerization methods, for example, by solution polymerization of the above unsaturated monomers in the presence of an initiator for radical polymerization.

The carboxyl-containing acrylic resins may have a number average molecular weight of generally 5,000 to 100,000, preferably 10,000 to 50,000, and an acid value as solids content of usually about 50 to 500, preferably 70 to 400. The organic solvents which may be used in the above ester addition reaction and the graft polymerization reaction should dissolve the aromatic epoxy resin and the carboxyl-containing acrylic resin, and when the carboxylate salt obtained by neutralizing the reaction product of these resins is diluted with water, should not hamper the formation of an emulsion, and should also be miscible with water. Examples include alcohol solvents, Cellosolve solvents and carbitol solvents.

In the ester addition reaction and the graft polymerization reaction, there is no strict limitation on the proportion of the acrylic resin or the radical polymerizable unsaturated monomer used relative to the aromatic epoxy resin. Usually, the weight ratio of the former to the latter is conveniently from 95/5 to 70/30, especially from 90/10 to 80/20. The carboxyl-containing radical-polymerizable unsaturated monomer as shown in (i) is used in an amount of 20 to 80% by weight, preferably 30 to 60% by weight, based on the entire radical polymerizable monomers.

The resulting epoxy-acrylate resin may be used as the binder component of the thermosetting paint (b) after the carboxyl groups in the resins are neutralized with basic compounds such as an amine or ammonia to render it water-soluble.

(c) A water-soluble thermosetting paint resulting from replacing 1 to 50% by weight of the binder component of the paint (b) with the resol-type phenol resin:

This paint (c) includes water-soluble thermosetting paints containing 50 to 99% by weight, preferably 70 to 97% by weight, of the epoxy-acrylate resin described in (b) above and 1 to 50% by weight, preferably 3 to 30% by weight, of the resol-type phenolic resin described in (a) above as binder components. By this combination of the resins, the curability of the coated film is improved, and a coated film can be formed which does not easily permit introduction of corrosive substances.

The overcoating paints selected from (a) to (c) used to form the overcoat layer (B) are formed by roller coating or spray coating on the primer coat layer (A) to a film thickness of 2 to 20 micrometers, especially 3 to 10 micrometers, and baked for about 5 seconds to about 30 minutes to give a multilayer coating.

The overcoating paints (a) to (c) may each be coated as a single layer and may be coated two or more times with the film thickness not exceeding 20 micrometers each time.

The multilayer coating in accordance with this invention can be applied to metallic cans (most of which are cylindrical in shape) produced from various known substrates such as aluminum, tin-free steel and electroplated tin plate. Cans for holding foods, beer and other drinks are mainly three-piece or two-piece punched and iron treated (D&I) types. Cans prepared from three pieces (main body, closure and bottom) are roll coated to form the multilayer coating before the metallic sheet is formed into a can, or spray-coated to form the multilayer coating after the metallic sheet was partially molded. D&I type can prepared by punching out a metal sheet and which form a cylindrical body closed at one end may be generally spray-coated to form the multilayer coating. In the multilayer coating obtained by this invention, the primer coat layer (A) mainly imparts corrosion resistance and adhesion to a metal substrate, and the overcoat layer (B) mainly imparts flavor retaining property and fabricability, and as a whole, the properties of the multilayer coating of this invention are much superior to conventional coated film applied on the interior surface of a can.

The present invention will now be illustrated specifically by the following production examples and examples. In the following, all parts and percentages are by weight. Resol-type phenolic resins will be referred to as resol resins.

PRODUCTION EXAMPLE 1

Production of a resin solution A:

Bisphenol A 100 parts, 178 parts of a 37% aqueous solution of formaldehyde and 1 part of sodium hydroxide were reacted at 60° C. for 3 hours. Under reduced pressure, the reaction mixture was dehydrated for 1 hour at 50° C. Then, 100 parts of butanol and 3 parts of phosphoric acid were added, and reacted at 110° to 120° C. for 2 hours. After the reaction, the solution was filtered, and the resulting sodium phosphate was separated by filtration. About 220 parts of a resol resin solution A was obtained. The solution has a heating residue of 50% and a viscosity of N (by Gardner bubble viscometer, 25° C.).

PRODUCTION EXAMPLE 2

Production of a resol resin solution B:

One hundred parts of phenolic resin, 400 parts of 37% formaldehyde, and 200 parts of 25% sodium hydroxide were mixed, and reacted at 60° C. for 3 hours. Then, 100 parts of n-butanol and then 200 parts of 20% hydrochloric acid were added. The mixture was separated into an upper organic layer and a lower aqueous layer. When the upper layer was washed twice with 200 parts of water, the lower layer became an organic layer. Part of the solvent in the organic layer was removed under reduced pressure to give about 200 g of a resol resin solution B having a heating residue of 50% and a viscosity of K (Gardner bubble viscometer, 25° C.).

PRODUCTION EXAMPLE 3

Production of an epoxy resin solution C:

Bisphenol-type epoxy resin (Epikote 1009, a tradename for a product of Yuka-Shell Co., Ltd.) having an epoxy equivalent of 2,720 was dissolved in a mixed solvent of cyclohexanone/xylol/ethylene glycol monoethyl ether acetate (1:1:1) to form an epoxy resin solution C having a resin solids concentration of 40%.

PRODUCTION EXAMPLE 4

Production of an epoxy resin solution D:Five

Five hundred parts of Epikote 828 (an epoxy resin produced by Yuka-Shell Co., Ltd., epoxy equivalent 184–194, viscosity 120–150 poises at 25° C., 286 parts of bisphenol A, 0.5 part of tri-n-butylamine and 86 parts of methyl isobutyl ketone were put in a reactor, and heated at 135° C. in a stream nitrogen. The mixture in the reactor heated to 180° C. It was cooled to 160° C., and then reacted for about 3 hours to give a 90% solution of an epoxy resin D having an epoxy value of 0.025 and a solution viscosity of $Z_6$ (Gardner-Holdt viscosity of a butylcarbitol solution having a resin solids concentration of 40% at 25° C.).

PRODUCTION EXAMPLE 5

Production of a carboxyl-containing acrylic resin solution E:

Four hundred parts of butanol was weighed into a four-necked flask equipped with a stirrer, a reflux condenser, a thermometer, a droping funnel and a nitrogen inlet, and then, 174 parts of methacrylic acid, 87 parts of styrene, 29 parts of ethyl acrylate and 14 parts of benzoyl peroxide (75% water-wetted product) were weighed into a beaker. They were well mixed with stirring to form a preliminary mixture.

The butanol in the flask was heated to 105° C., at this temperature, the preliminary mixture was added dropwise over 3 hours from a dropping funnel. The mixture was further maintained for 2 hours at the same temperature to terminate the copolymerization. Then, 290 parts of 2-butoxyethanol was added to obtain a carboxyl-containing acrylic resin solution E having a solids content of 30%, a resin acid value of 390 and a viscosity of 370 centipoises.

PRODUCTION EXAMPLE 6

Production of a paint (I) for formation of a primer coat layer (A):

| Formulation | |
|---|---|
| Epoxy resin solution C | 100 parts |
| Ethyl Cellosolve | 780 parts |
| Butanol | 1000 parts |
| Resol resin solution A | 120 parts |
| Total | 2000 parts |

Butyl Cellosolve was added to the epoxy resin solution C. They were mixed and diluted. With good stirring, the resol resin solution A was added to prepare a paint (I).

| Formulation | |
|---|---|
| Water-base paint (IV) (*) | 100 parts |
| Resol resin B | 50 parts |
| Dimethylaminoethanol | 3 parts |
| Deionized water | 847 parts |
| Total | 1000 parts |

While 100 parts of the water-base paint (IV) was well stirred, the resol resin B was added to prepare a uniform mixture. Three parts of dimethylaminoethanol was added to neutralize the resol resin. Furthermore, 847 parts of deionized water was added to give a paint (II) for formation of a primer coat layer (A).

| Formulation | |
|---|---|
| (1) Acrylic resin solution E | 150 parts |
| (2) Epoxy resin solution D | 283 parts |
| (3) n-Butanol | 86 parts |
| (4) 2-Butoxyethanol | 47 parts |
| (5) Deionized water | 3.2 parts |
| (6) Dimethylaminoethanol | 5.3 parts |
| (7) Dimethylaminoethanol | 9.5 parts |
| (8) Resol resin solution A | 30 parts |
| (9) Deionized water | 646 parts |
| Total | 1260 parts |

The above ingredients (1) to (4) were put in a reaction vessel, and heated at 115° C. to dissolve the resin components. The solution was then cooled to 105° C. The ingredients (5) and then (6) were added, and the mixture was maintained at 105° C. The reaction product consisted of acrylic resin/epoxy resin in a weight ratio of 15/85 (solids content). The reaction was monitered by measuring the acid value of the product. At the end point of the reaction, the acid value was 51. Then, 3 hours later, the ingredient (7) was added, and 5 minutes later, the ingredient (8) was hot-blended at 105° C. Thereafter, the ingredient (9) was added over 30 minutes to obtain a stable water-base paint having a solids content of 25%.

PRODUCTION EXAMPLE 8

Production of an overcoating paint (III):

| Formulation | |
|---|---|
| (1) Epoxy resin solution C | 200 parts |
| (2) Butyl Cellosolve | 90 parts |
| (3) Resol resin A | 40 parts |
| Total | 330 parts |

Butyl Cellosolve was added to the epoxy resin solution C. They were mixed and diluted. Then, with good stirring, the resol resin A was added to obtain an overcoating paint (III).

EXAMPLES 1–4 AND COMPARATIVE EXAMPLES 1–2

The combination of the primer coating paint and the overcoating paint shown in Table 1 was coated by a bar coater to give a multilayer coating. The primer coat layer and the overcoat layer were dried by heating at 200° C. for 60 seconds.

The properties of the resulting multilayer coatings are shown in Table 2 below.

TABLE 1

| | Primer coat layer (A) | | Overcoat layer (B) | | Third overcoat layer | |
|---|---|---|---|---|---|---|
| | Paint | Dry film thickness | Paint | Dry film thickness | Paint | Dry film thickness |
| Example 1 | (I) | 0.5μ | (III) | 5μ | — | — |
| Example 2 | (I) | 0.5μ | (IV) | 5μ | — | — |
| Example 3 | (II) | 0.5μ | (IV) | 5μ | — | — |
| Example 4 | (II) | 0.5μ | (IV) | 5μ | (IV) | 5μ |
| Comparative Example 1 | — | — | (III) | 5μ | — | — |
| Comparative Example 2 | — | — | (IV) | 5μ | (IV) | 5μ |

TABLE 2

| Test item | Adhesion | Boiling water resistance | Solvent resistance (peelability) | Corrosion resistance | Fabricability | Water extracting flavor test | Amount of potassium permanganate consumed |
|---|---|---|---|---|---|---|---|
| Example 1 | ○ | ○ | ○ | ○ | ○ | ○ | 2.9 |
| Example 2 | ○ | ○ | ○ | ○ | ○ | ○ | 0.8 |
| Example 3 | ○ | ○ | ○ | ⊚ | ○ | ○ | 1.3 |
| Example 4 | ○ | ○ | ○ | ○ | ○ | ○ | 0.9 |
| Comparative Example 1 | ○ | ⊚ | ○ | △ | ⊚ | ○ | 2.5 |
| Comparative Example 2 | ○ | ○ | △ | △ | ○ | ○ | 0.8 |

Tests for evaluating the properties of the coatings.
(1) Adhesion

Eleven cuts with a width of about 1.5 mm were formed longitudinally and laterally in a crosscut pattern. Cellophane adhesive tape with a width of 24 mm was applied to the crosscut surface, and the adhesion of the crosscuts was observed when it was strongly peeled off.
○: No peeling
: Some peeling
◉: Peeling
X : Marked peeling (2) Boiling water resistance A test panel prepared by coating on a tin plate was treated in water at 100° C. for 30 minutes. The coated film was evaluated for adhesion by visual observation and Cellophane tape peeling as in (1) above.

(3) Solvent resistance

A coated tin plate was cut to a size of 10 cm × 10 cm, and immersed in boiling chloroform. After treatment in boiling chloroform for 1 hour, the state of peeling of the coated film was visually observed.
○: No peeling
: Some peeling
◉: Peeling
X : Marked peeling (4) Corrosion resistance A can body inside surface obtained by cutting open a non-coated steel two-piece can before seaming of a closure was coated, and the coated film surface was cut in a pattern of X by means of a knife. The test piece was treated at 125° C. for 30 minutes in o a 1% aqueous solution of sodium chloride, and the degree of corrosion near the X mark was evaluated.
○: No change
⊘: Some corrosion
△: Corrosion occurred
X : Marked corrosion (5) Fabricability Samples prepared by coating on a #25 tinplate and folded in two are placed at the bottom of a specially folded Du Pont impact tester, and a 1 kg iron weight having a smooth contacting surface is allowed to fall down from a height of 50 cm to measure length of cracks developed on the film in the folded part.
○: 0–9 mm
⊘: 10–14 mm
△: 15–20 mm (6) Water extract flavor test A pyrex glass bottle is charged with 100μm aluminum foils coated with various coating compositions and water prepared by treating tap water with active carbon so that the coated area to the amount of the treated water may be 4 cm² to 1 ml and is then closed, followed by being sterilized at 100° C. for 30 minutes in an autoclave and by being subjected to flavor test and evaluated as follows.
○: No change
⊘: Some change
△: Changed
X : Considerably changed (7) Amount of potassium permanganate consumed Measured in accordance with the testing method (Ministry of Health and Welfare No. 434) described in the Food Sanitation Law on the water prepared in section (6) for testing the flavor retaining property. The amount of potassium permanganate consumed was expressed in ppm.

We claim:

1. A multilayer coating for the interior surface of a can, said coating being consisting essentially of
   (A) a primer coat layer having a dry film thickness of not more than 1 micrometer formed by using a thermosetting paint consisting essentially of 59 to 98% by weight of a resol-type phenolic resin and 5 to 50% by weight of an epoxy-type resin having compatibility with the phenolic resin as a binder, and
   (B) an overcoat layer formed by overcoating a thermosetting paint to a dry film thickness of 2 to 20 micrometers, said thermosetting paint being selected from the group consisting of
   (a) an organic solvent-base thermosetting paint having a binder component composed of 50 to 95% by weight of an aromatic epoxy resin and 5 to 50% by weight of a resol-type phenolic resin,
   (b) a water-soluble or water-dispersible thermosetting paint having a binder component composed of an epoxy-acrylate resin which is a reaction product between a carboxyl-containing acrylic resin and an aromatic epoxy resin, and
   (c) a water-soluble or water-dispersible thermosetting paint having a binder component composed of 50 to 99% by weight of an epoxy-acrylate resin which is a reaction product between a carboxyl-containing acrylic resin and an aromatic epoxy resin, and 1 to 50% by weight of a resol-type phenolic resin.

2. The multilayer coating of claim 1 in which the primer coat layer (A) is formed from a thermosetting water-base paint containing a binder composed of 60 to 80% by weight of a resol-type phenolic resin and 20 to 40% by weight of an epoxy resin.

3. The multilayer coating of claim 1 in which the resol-type phenolic resin is obtained by reacting a trifunction or higher functional phenol with formaldehyde in the presence of an alkaline catalyst.

4. The multilayer coating of claim 1 in which the epoxy resin is a bisphenol-type epoxy resin.

5. The multilayer coating of claim 4 in which the bisphenol-type epoxy resin has an epoxy equivalent of 1,500 to 3,500.

6. The multilayer coating of claim 1 in which the epoxy resin is a water-soluble or water-dispersible epoxy-acrylate resin which is the reaction product between a carboxyl-containing acrylic resin and an aromatic epoxy resin.

7. The multilayer coating of claim 1 in which the thermosetting paint (a) contains a binder composed of 70 to 90% by weight of the aromatic epoxy resin and 10 to 30% of the resol-type phenolic resin.

8. The multilayer coating of claim 1 in which the thermosetting paint (b) containing a binder composed of an ester between the aromatic epoxy resin and the carboxyl-containing acrylic resin.

9. The multilayer coating of claim 8 in which the aromatic epoxy resin has a number average molecular weight of 1,400 to 8,000.

10. The multilayer coating of claim 8 in which the carboxyl-containing acrylic resin has a number average molecular weight of 5,000 to 100,000 and an acid value of 50 to 500.

11. The multilayer coating of claim 1 in which the primer coat layer (A) and the overcoat layer (B) are formed from organic solvent-base thermosetting paints.

12. The multilayer coating of claim 1 in which the primer coat layer (A) and the overcoat layer (B) are formed from water-base or water-dispersible thermosetting paints.

* * * * *